Feb. 8, 1938.　　　A. J. T. HOLTON　　　2,107,480
STEAM COOKING BOILER AND BAKER
Filed Oct. 23, 1936　　　2 Sheets-Sheet 2
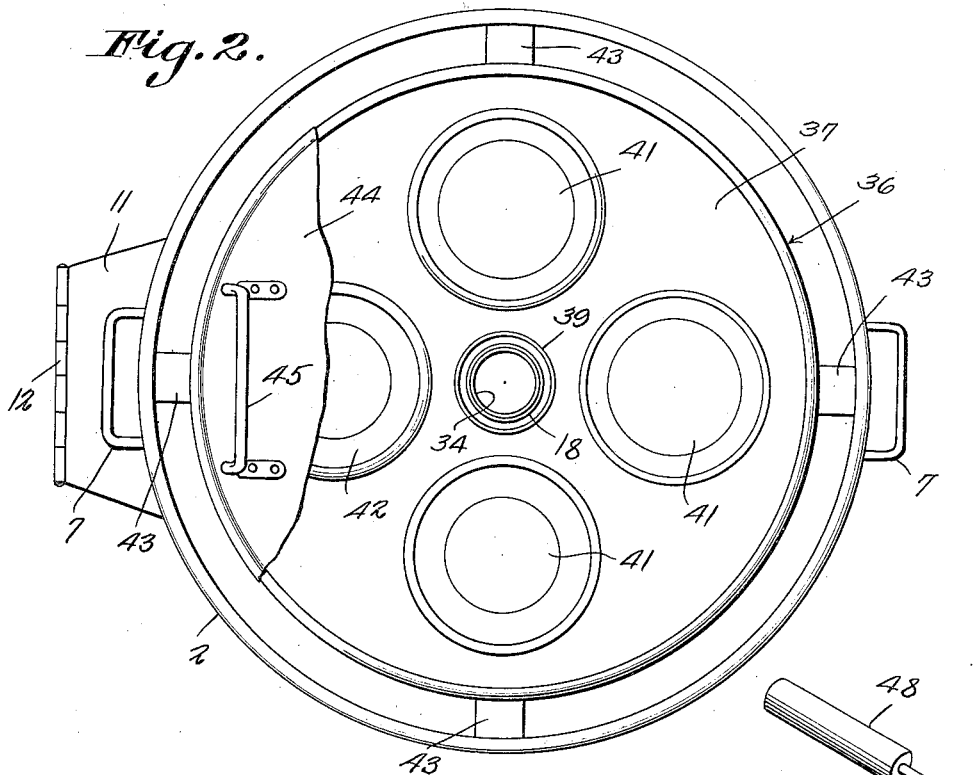
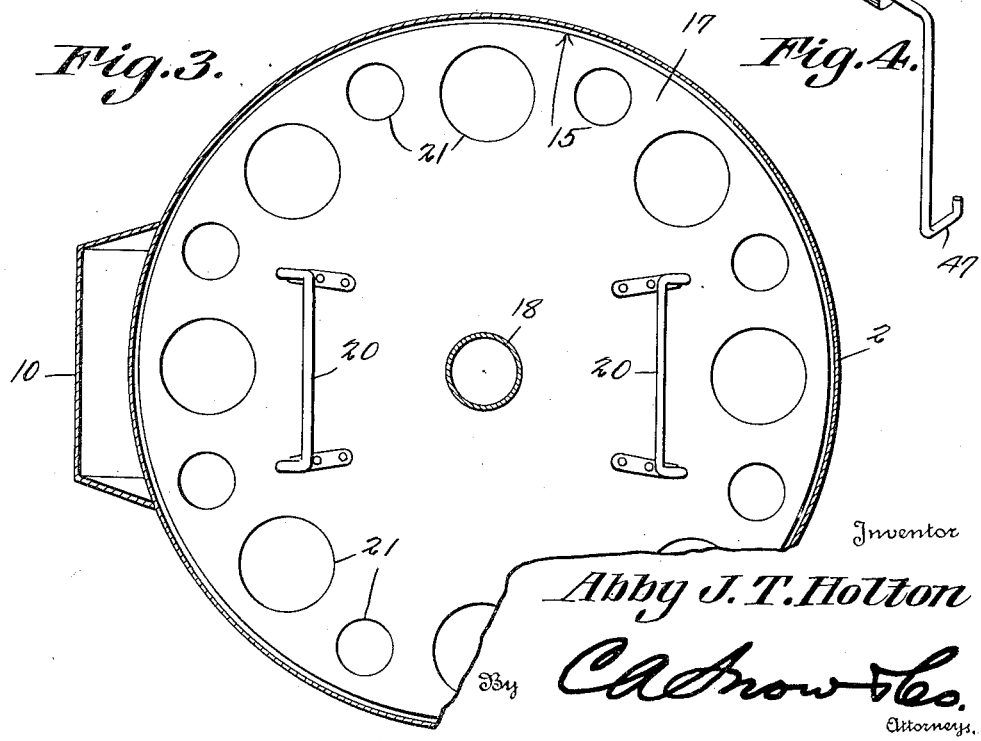
Inventor
Abby J. T. Holton
By C. A. Snow & Co.
Attorneys.

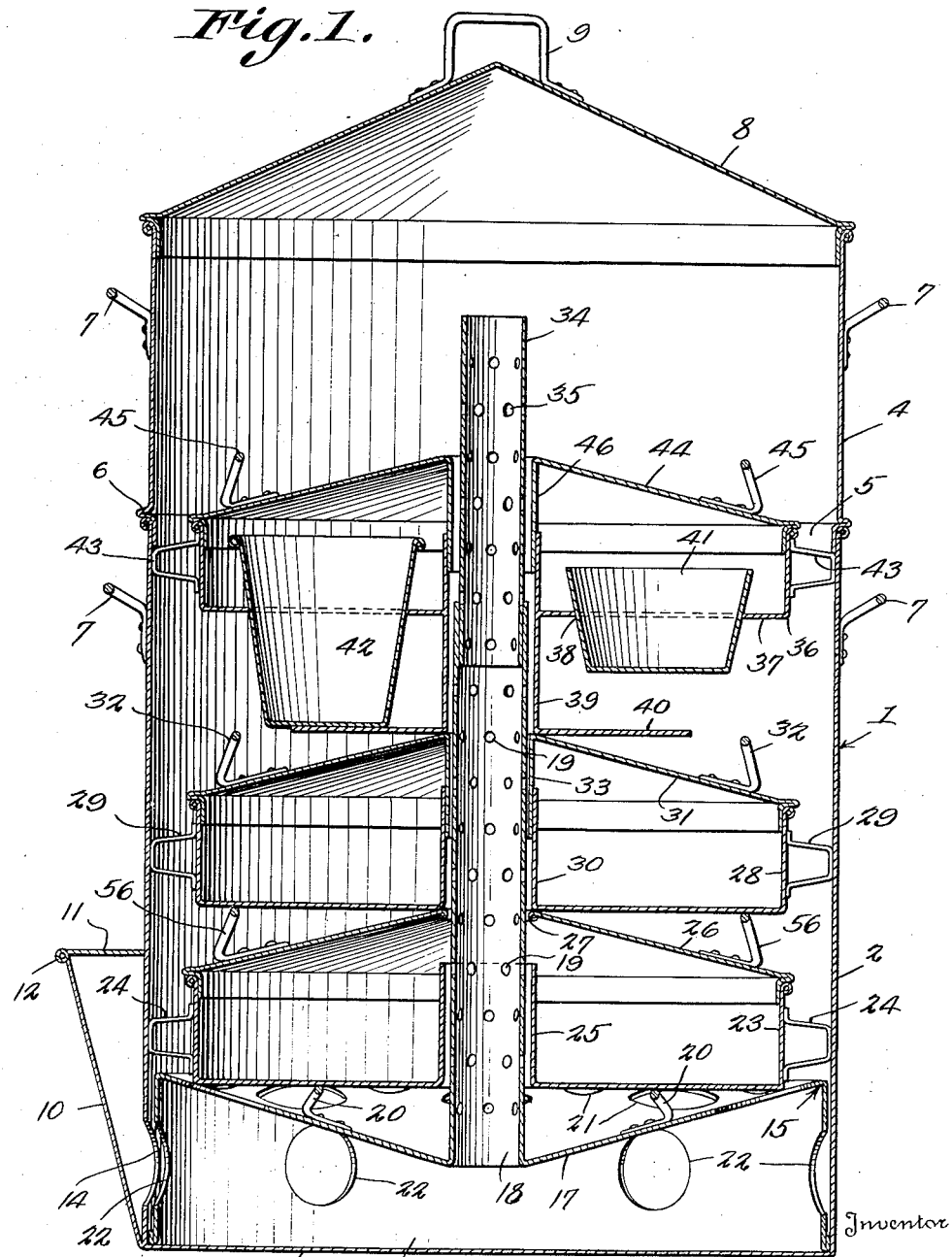

Patented Feb. 8, 1938

2,107,480

UNITED STATES PATENT OFFICE 2,107,480

STEAM COOKING BOILER AND BAKER

Abby Jane Tilton Holton, Concord, Vt.

Application October 23, 1936, Serial No. 107,278

5 Claims. (Cl. 53—2)

This invention aims to provide a novel means for cooking green leafy vegetables and the like, there being no water in the dish in which the vegetables are located, and just enough steam being supplied to cook the vegetables, there being no surplus water to turn away, with a corresponding loss of vitamins.

Another object of the invention is to supply a device of the class described, wherein baking by steam may be accomplished, if the operator wishes.

Another object of the invention is to supply a cooking utensil of the sort alluded to, the capacity of which may be changed by lengthening it vertically and supplying corresponding supplemental parts.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in vertical section, a device constructed in accordance with the invention;

Fig. 2 is a top plan wherein the cover for the main receptacle has been removed, parts being broken away;

Fig. 3 is a transverse section taken through the device in a plane above the support which is located at the bottom of the main receptacle.

Fig. 4 is a perspective view showing the manipulating hook.

The device forming the subject matter of this application preferably is made of metal, and comprises a tubular casing, which, as a whole is marked by the numeral 1. The casing 1 embodies a lower member 2 having a bottom 3. The casing 1 comprises an upper member 4, the lower end 5 of which fits within the upper end of the lower member 2, the upper member 4 having an outstanding shoulder 6 which prevents the upper member 4 from sliding downwardly in the lower member 2. In order that the constituent members 2 and 4 of the casing 1 may be handled conveniently, they are supplied with external, oppositely disposed handles 7. The upper member 4 of the casing 1 is surmounted by a removable cover 8 having a handle 9. A water receiver 10 is secured to the outer surface of the lower member 2, at the lower end of said member. A lid 11 has its outer edge hinged at 12 to the receiver 10, the inner edge of the lid fitting closely about the lower member 2, to prevent the loss of steam. In the lower member 2 there is an opening 14 which communicates with the water receiver 10.

In the lower end of the casing 1 is placed an inverted cup-shaped support 15, including an annular body 16, spaced slightly from the lower member 2, the body 16 of the support 15 resting on the bottom 3 of the lower member 2. The support 15 includes a funnel-shaped top 17, carrying a central upstanding flue 18, supplied with perforations 19. The top 17 has upstanding U-shaped handles 20. There are openings 21 in the top 17 and the body 16 of the support 15 is provided with openings 22, one of which may be in registration with the opening 14 that leads to the water receiver 10, although water from the receiver will find its way into the support 15, below the top 17, through any of the openings 22 in the body 16, since the body 16 is spaced from the lower member 2 of the casing 1, as mentioned hereinbefore and as shown in Fig. 1.

The numeral 23 marks a cooking dish located in the lower member 2 of the casing 1 and having a flat bottom resting at its periphery on the top 17 of the support 15, the bottom of the dish 23 resting also, on the handles 20 of the support 15. The cooking dish 23 has outstanding handles 24 which, cooperating with the member 2 of the casing 1, centralize the cooking dish 23 in the lower member 2.

The bottom of the cooking dish 23 is equipped with an upstanding sleeve 25, surrounding but spaced from the flue 18 that is carried by the top 17 of the support 15. The sleeve 25 terminates in spaced relation to an inverted funnel shaped cover 26 mounted removably on the dish 23 and provided with upstanding loop-shaped handles 56. At its apex, the cover 26 has a central opening 27, through which the flue 18 passes, there being, however, no steam-tight joint at the opening 27.

The numeral 28 designates a baking dish, constructed like the cooking dish 23 and supported on the handles 56 of the cover 26 of the cooking dish 23. The baking dish 28 has outstanding handles 29, functioning like the handles 24. The sleeve of the baking dish 28 is marked by the numeral 30. The dish 28 carries a removable cover 31 having handles 32. The essential difference between the dish 28 and the dish 23 is that the cover 31 of the dish 28 has a central depending tubular neck 33 which fits closely within the sleeve 30 of the dish 28.

The lower end of a removable flue extension 34 fits frictionally in the upper end of the main part 18 of the flue, so that the flue extension 34 will not slide down freely from the position shown in Fig. 1. The flue extension 34 projects upwardly into the upper member 4 of the casing 1 and has perforations 35.

Within the casing 1 is disposed a baking dish 36, having a flat bottom 37 supplied with openings or seats 38. The bottom 37 of the baking dish 36 carries a fixed tubular sleeve 39 which extends upwardly and downwardly with respect to the bottom 37 of the baking dish. The lower end of the sleeve 39 rests on the cover 31 of the dish 28 and carries an outstanding disk like platform 40. Cups or containers 41 and 42 are mounted removably in the seats 38 of the bottom 37 of the dish 36. If some of the cups, such as the cup 42 of Fig. 1, are long enough, they will be supported on the platform 40. This dish 36 has outstanding handles 43 corresponding to the handles 29 and 24. On the dish 36 is mounted an inverted funnel shaped cover 44 having handles 45. The cover 44 has a depending neck 46, making a tight fit within the upper end of the sleeve 39 of the dish 36, the neck 46, however, being spaced from the flue extension 34.

When the parts are arranged as shown in Fig. 1, a small quantity of water may be poured into the receiver 10, the water finding its way through the openings 14 and 22, into the support 15, below the top 17 of the support. If heat is applied to the casing 1, steam is created in the lower end of the casing, and the steam rises in the casing 1, around the outside of the dishes 23, 28 and 36. Steam rises also through the flue 18 and its extension 34. As the steam rises in the flue 18, some of the steam passes through the perforations 19, and some of the steam passes through the sleeve 25, into the dish 23, just enough moisture being added to the material in the dish 23 to effect a proper steaming or cooking, without creating surplus water to be drained away with a corresponding loss of vitamins.

The steam passes upwardly through the flue 18, but does not enter the dish 28, because the neck 33 on the cover 31 of the dish 28 fits tightly within the sleeve 30 on the bottom of said dish. The material in the dish 28, therefore, may be baked by steam, but is not subjected directly to the action of the steam. As the steam moves upwardly through the extension 34 of the flue, the steam does not enter the dish 36, because the neck 46 on the cover 44 of the dish fits tightly in the upper end of the sleeve 39 which is carried by the bottom of the said dish. The material in the cups 42 and 41, therefore, or in the dish 36, about the cups, is steam-baked but is not subjected to the direct action of the steam.

If the operator wishes, he may remove the upper member 4 of the casing, the dish 36 and associated parts, and the flue extension 34, the cover 8 then being placed directly upon the upper end of the lower member 2 of the casing 1.

In practice, two of the covers 31 and two of the covers 26 are supplied. Therefore, the cover 31 of Fig. 1 may be replaced by a cover constructed like the cover 26. Then the material in both of the dishes 23 and 28 will be steamed. It is possible, likewise, to replace the cover 26 of Fig. 1 by a cover constructed like the cover 31, and then the contents of both dishes 28 and 23 will be baked, rather than steamed or cooked.

For convenience in handling any movable parts of the device, there is supplied the hook 47 of Fig. 4, said hook carrying a laterally offset grip 48.

Having thus described the invention, what is claimed is:

1. In a device of the class described, a casing having a steam chamber in its lower portion, a dish in the casing and disposed above the steam chamber, and a cover on the dish, the cover having an opening, the bottom of the dish being supplied with an upstanding sleeve terminated in spaced relation to the cover, the steam chamber being provided with a flue which extends upwardly through the sleeve and through the opening, the flue having a perforation which communicates with the dish.

2. In a device of the class described, a casing having a steam chamber in its lower portion, superposed lower and upper dishes in the casing, covers for the dishes, each dish being provided on its bottom with an upstanding sleeve, the sleeves terminating at their upper ends in spaced relation to the covers, one cover having an opening, the other cover being provided with a depending neck which is telescoped closely upon the corresponding sleeve, the steam chamber being provided with a flue which extends upwardly through the sleeves, the opening, and the neck, the flue being provided with a perforation which communicates with that dish the cover whereof has the opening.

3. In a device of the class described, a casing having a steam chamber in its lower portion, a dish in the casing and disposed above the steam chamber, a cover on the dish, the cover having an opening, the bottom of the dish being supplied with an upstanding sleeve terminated in spaced relation to the cover, the steam chamber being provided with a flue which extends upwardly through the sleeve and through the opening, the flue having a perforation which communicates with the dish, the steam chamber being formed within an inverted cup-shaped support, on which the dish rests, the flue being connected to the top of the support, the casing and the support having lateral openings for the admission of water, and the casing being provided on its outer surface with a water receiver discharging into the steam chamber, through the last-specified openings.

4. In a device of the class described, a casing made up of upper and lower members, the lower end of the upper member being detachably engaged with the upper end of the lower member, a lid on the upper member, a steam chamber in the lower portion of the lower member, superposed upper and lower dishes in the casing, and covers for the dishes, the steam chamber having a flue passing through the lower dish and its cover, a removable tubular extension for the flue, the extension passing through the cover of the upper dish, the extension, the upper casing member and the upper dish being removable, and the lid being so shaped that it will then serve as a closure for the upper end of the lower casing member.

5. In a device of the class described, a casing having a steam chamber in its lower portion, a dish in the casing and having a seat in its bottom, a sleeve carried by the bottom of the dish and extended downwardly and upwardly with respect to the bottom of the dish, a platform carried by the lower portion of the sleeve and disposed below the bottom of the dish, and a cup in the seat and supported by the platform, the cover having a depending neck telescoped tightly with respect to the upper portion of the sleeve, the steam chamber having a flue which extends upwardly through the sleeve and the neck.

ABBY JANE TILTON HOLTON.